US006461724B1

(12) United States Patent
Radovanovic et al.

(10) Patent No.: US 6,461,724 B1
(45) Date of Patent: Oct. 8, 2002

(54) MICROPOROUS MATERIAL RESISTANT TO CAPILLARY COLLAPSE

(75) Inventors: Philip D. Radovanovic, Minneapolis; Mario A. Perez, Burnsville; Scott D. Thomas, Woodbury, all of MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/385,265

(22) Filed: Aug. 30, 1999

(51) Int. Cl.[7] .................................................. B32B 3/00
(52) U.S. Cl. ............................... 428/315.5; 428/315.9; 428/316.6; 264/45.1; 429/254
(58) Field of Search .......................... 428/315.5, 315.9, 428/316.6; 264/45.1; 429/254

(56) References Cited

U.S. PATENT DOCUMENTS

| | | | |
|---|---|---|---|
| 4,024,323 A | 5/1977 | Versteegh | 429/249 |
| 4,539,256 A | 9/1985 | Shipman | 428/315.5 |
| 4,726,989 A | 2/1988 | Mrozinski | 428/315.5 |
| 4,731,304 A | 3/1988 | Lundquist et al. | 429/62 |
| 4,863,792 A | 9/1989 | Mrozinski | 428/315.5 |
| 4,867,881 A | 9/1989 | Kinzer | 210/490 |
| 4,957,943 A | 9/1990 | McAllister et al. | 521/64 |
| 5,359,001 A | * 10/1994 | Epple et al. | 525/97 |
| 5,385,777 A | 1/1995 | Higuchi et al. | 428/316.6 |
| 5,453,333 A | 9/1995 | Takauchi et al. | 426/62 |
| 5,573,717 A | * 11/1996 | Peiffer et al. | 264/45.1 |
| 5,866,246 A | 2/1999 | Schreck et al. | 428/327 |
| 5,939,181 A | * 8/1999 | Kumano et al. | 428/315.5 |

FOREIGN PATENT DOCUMENTS

| | | | | |
|---|---|---|---|---|
| JP | 9-180699 | 7/1997 | | H01M/2/16 |
| WO | WO 98/49225 | 11/1998 | | C08J/5/18 |
| WO | WO 99/33647 | 7/1999 | | B32B/3/26 |
| WO | WO 00/09597 | 2/2000 | | C08J/9/28 |

OTHER PUBLICATIONS

Bigg, D.M., "Mechanical Property Enhancement of Semi-crystalline Polymers—A Review," *Polymer Engineering and Science*, vol. 28, No. 13, Jul. 1988, pp. 829–861.

Topas™ Cyclic Olefin Copolymers, Hoechst Celanese product literature, Jan. 1996.

Johnson, B.A. and White, R.E.; "Characterization of Commercially Available Lithium–ion Batteries," *J. Power Sources*, 70, 1998, pp. 48–54.

* cited by examiner

*Primary Examiner*—Blaine Copenheaver
*Assistant Examiner*—Leanna Roche
(74) *Attorney, Agent, or Firm*—Dean M. Harts; Douglas B. Little

(57) ABSTRACT

Microporous material comprising a polypropylene polymer having at least 20 percent crystallinity; and a compatible, amorphous, glassy polymer, wherein said polymers are miscible in a compound when heated above the melting temperature of the polypropylene polymer and wherein a polypropylene polymer phase separates from the compound when cooled below the crystallization temperature of the polypropylene polymer. Microporous material is made by a thermally induced phase separation process using a compound such as mineral oil to form one phase containing both polymers. The pores of the microporous material resist collapse during processing. Membranes made of this material are useful as battery separators having a good combination of strength, porosity, and ionic resistance when imbibed with an electrolyte.

19 Claims, 1 Drawing Sheet

MICROPOROUS MATERIAL RESISTANT TO CAPILLARY COLLAPSE

TECHNICAL FIELD

This invention relates to microporous materials or films comprising a compatible, melt-processable polymer mixture and a method of making the same. The material or film is useful as a single layer or as part of a multi-layer structure and is useful in articles such as battery separators.

BACKGROUND

Porous films made from mixtures of blends of polyolefin materials used as membranes and as thermal shutdown separators for batteries are known. Shutdown separators are safety devices which, for example in the case of lithium ion batteries, prevent dangerous overheating by closing off the pores (and effectively stopping the electrolytic reaction) at a temperature reached before a dangerous condition exists. They effectively act as fuses.

DISCLOSURE OF INVENTION

Briefly, the present invention provides a microporous material comprising a polypropylene polymer having at least 20 percent crystallinity; and a compatible, amorphous, glassy polymer, wherein said polymers are miscible in a compound when heated above the melting temperature of the polypropylene polymer and phase separate from the compound when cooled.

In another aspect, the present invention provides a method of making microporous material, comprising: (a) melt blending to form a mixture comprising about 15 to 80 parts by weight of a polypropylene polymer having at least 20 percent crystallinity, greater than 0 to 30 parts by weight of a compatible, amorphous, glassy polymer, and about 20 to 85 parts by weight, based on a total mixture content, of a compound, the compound being miscible with the polypropylene and glassy polymer at a temperature above the melting temperature of the polypropylene polymer; (b) shaping the melt blended material; (c) cooling the shaped material to a temperature at which phase separation occurs between the compound and the polymers through crystallization of the polypropylene polymer to form a network of polymer domains; and (d) creating porosity by at least (1) orienting said material at least in one direction to separate adjacent crystallized polymer domains from one another to provide an interconnected porous network therebetween, or (2) removing at least a part of the compound. When creating the porosity, both steps of orienting the material and removing at least a part of the compound may be combined.

In still another aspect, the present invention provides a method of making microporous material, comprising (a) melt blending to form a substantially homogeneous mixture comprising about 15 to 80 parts by weight of a polypropylene polymer having at least 20 percent crystallinity, greater than 0 to 30 parts by weight of a compatible, amorphous, glassy polymer, and about 20 to 85 parts by weight, based on a total mixture content, of a compound, the compound being miscible with the polypropylene and glassy polymer at a temperature above the melting temperature of the polypropylene polymer; (b) shaping the melt blended material; (c) cooling the shaped material to a temperature at which phase separation occurs between the compound and the polymers through crystallization of the polypropylene polymer to form a network of polymer domains; (d) stretching the shaped material in at least two perpendicular directions to provide a network of interconnected pores; and (e) removing the compound to provide a microporous material. The step of stretching the material may be performed before the step of removing the compound.

As used herein "compatible" with reference to polymers means one material able to form a substantially homogeneous mixture with a polymer with which it is compatible, said mixture capable of forming a transparent cast or extruded film. Such a material can be compatible with such a polymer within a certain weight ratio range of material to polymer and incompatible (i.e., unable to form a transparent film) outside that weight ratio range.

"Miscible" means a solute (polymer) is soluble in a solvent (the compound) such that the combination of solute and solvent appears to be a single phase exhibiting no apparent phase separation, which may depend on the temperature of the combination.

It is an advantage of the present invention to provide a porous matrix resistant to pore collapse arising from capillary forces that occur during drying. It is another advantage of the present invention to provide a microporous material with improved thermal stability.

DETAILED DESCRIPTION

Figure 1:
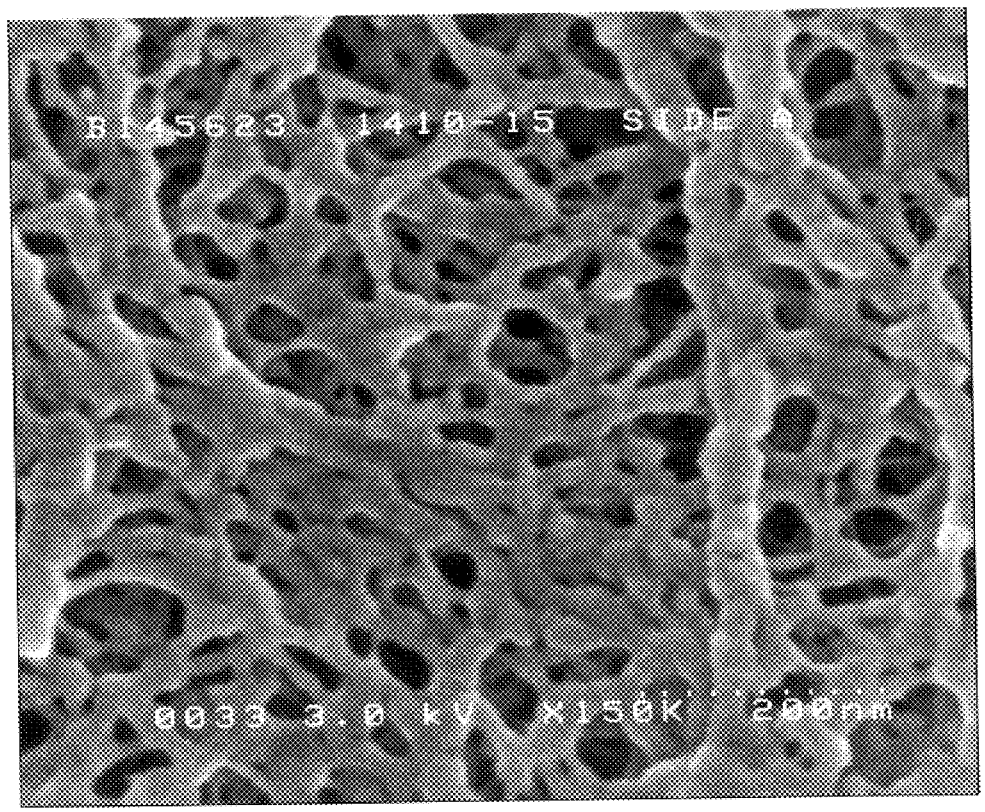
FIG. 1 is a digital image of a field emission scanning electron micrograph taken at 150,000×magnification of one side of a capillary collapse resistant material of the present invention.

The present invention provides a microporous material comprising a polypropylene polymer having at least 20 percent crystallinity; and a compatible, amorphous, glassy polymer, wherein said polymers are miscible in a compound when heated above the melting temperature of the polypropylene polymer and phase separate from the compound when cooled below the crystallization temperature of the polypropylene polymer.

The polypropylene polymer has a crystallinity of at least 20%. Such polypropylenes are commonly referred to as semi-crystalline. If the crystallinity is below about 20%, it is very difficult to make a porous film by crystallization precipitation. The polypropylene polymer has a molecular weight from about 50,000 to 500,000 (preferably 100,000 to 300,000), a melting point preferably from about 140 to 170° C., and a melt flow index from about 0.1 to 20 grams per 10 minutes (preferably 0.5 to 8).

The amorphous polymer preferably has a Tg above 20° C. (more preferably above 80° C.). Preferred amorphous glassy polymers compatible with polypropylene are cyclic olefinic copolymers. More preferred amorphous glassy polymers compatible with polypropylene are ethylene norbomene copolymers. The Tg of these amorphous glassy polymers depends on the relative ratio of ethylene to norbornene segments. That is, increasing the norbomene level, and thus reducing the ethylene level, increases the Tg of the copolymer.

The polypropylene polymer and the compatible, amorphous, glassy polymer are miscible in another compound when heated above the melting temperature of the polypropylene polymer. The polymer components are compatible in the mixture.

Compatibility also affects the range of useful polymer concentrations. If polymers are compatible, a common solvent can promote their miscibility into the composition regions of much higher polymer concentrations, thus allowing the use of common processing techniques such as extrusion to make articles of this invention. Under these conditions, all components in the melt are miscible and phase-separate by crystallization precipitation upon cooling below the phase separation temperature. The rate of cooling is quite rapid and is controlled by process conditions that minimize the size of phase-separated microdomains and provide uniformity on a microscopic level.

Compatibility also affects the material or film uniformity. Cast films that are made from compatible blends by the method of this invention are transparent, which confirms the uniformity on a microscopic level. This uniformity is of great importance for successful post-processing, as films with a lesser degree of uniformity made from incompatible polymers easily break during stretching. Film uniformity is also important in some applications, such as thermal shutdown battery separators, where a reliable shutdown performance on a microscopic level is desirable to prevent local overheating when a short develops across the separator.

Materials useful as the compound are those that form a solution with a mixture of the polymers at an elevated temperature to form a solution but also permit the polymers to phase separate when cooled. That is, the compound is a common latent solvent for both the polypropylene and the amorphous glassy polymer. Compounds suitable for the melt blending operation with a polymer mixture to make the microporous material of the invention by crystallization precipitation are liquids or solids at room temperature in which the polypropylene polymer mixture will dissolve at a temperature above the melting temperature of the polypropylene but will phase separate on cooling at or below the crystallization temperature of the polypropylene.

Preferably, these compounds have a boiling point at atmospheric pressure at least as high as the melting temperature of the polypropylene polymer. Compounds having lower boiling points may be used in those instances where pressures above atmospheric may be employed to elevate the boiling point of the compound to a temperature at least as high as the melting temperature of the polypropylene polymer. Generally, suitable compounds have a solubility parameter within a few units of the values of this parameter for the polypropylene polymer and the amorphous glassy polymer. Mineral oil and mineral spirits are examples of mixtures of these compounds since they are typically blends of hydrocarbon liquids. Other useful compounds include paraffin wax and liquid paraffin. Particularly useful with the polypropylene polymer in the present invention are mineral oil, dioctylphthalate, or mineral spirits.

The microporous material may also contain, in addition to compounds above described, conventional fillers or additive materials in limited quantity so as not to interfere with the formation of the microporous material of the present invention, and so as not to result in unwanted exuding of the additive. Such additives may include anti-static materials, dyes, plasticizers, UV absorbers, nucleating agents and the like. The amount of additive is typically less than 10% of the weight of the polymeric mixture, preferably less than 2% by weight.

A melt solution may be prepared by mixing the polypropylene polymer component and the amorphous glassy polymer with the compound under agitation such as that provided by an extruder and heating until the temperature of the mixture is above the melting point of the polypropylene polymer component. At this point the mixture becomes a melt.

Once the melt is prepared, a shaped material is then formed by known methods, for example using an extruder and die to form a film or a sheet. Cooling of the shaped material then takes place either in the extruder, at or near the die, or preferably by contacting the shaped material with a casting wheel or drum, a water bath, or with air. Cooling causes the phase separation to occur between the compound and the polymer components. In the present invention this phase separation occurs through crystallization precipitation of a polypropylene polymer component to form a network of polymer domains comprising the polypropylene polymer, amorphous glassy polymer, and compound, and a second phase comprising the compound with adjacent polymer domains being distant but having a plurality of zones of continuity. The rate of crystallization must be sufficient to achieve the overall desired number of crystal sites. The crystallization rate is impacted by known processing conditions, and in those cases where the rate of crystallization is excessively slow additional factors must be considered, such as increased heat transfer (i.e., faster quench rate) and/or the addition of nucleating agents.

The shaped material lacks porosity at this stage. Porosity is created by orienting the material at least in one direction (preferably at least two directions perpendicular to each other) to separate adjacent crystallized polymer domains from one another to provide an interconnected porous network therebetween. Porosity may also be generated by removing at least a part of the compound, as described below. Both of these methods may be employed with the same raw material.

Orienting in two directions perpendicular to each other, or biaxial stretching, may be performed either in sequentially or simultaneously. Sequential stretching is carried out by drawing the films with a length orienter and a tenter (i.e., orienting machine direction and cross-web direction respectively). Simultaneous stretching is carried out by drawing the film in both directions at the same time. The degree of stretch may be the same or may be different in each direction.

A multiplicity of air voids or porosity is achieved by removing some or all of the compound through a removal step. The removal of the compound from the interconnected porous network may be carried out by washing, extraction or any other convenient known method, thus providing a microporous shaped material. This may be done either before or after orientationa of the shaped material. One peferred method includes stretching the shaped material in at least one direction to provide a network of interconnected regions comprising the compound, followed by removing some or all of the compound to provide a microporous material. Removing the compound involves significant capillary forces that can collapse air voids in the microporous material leading to greater resistance to air flow. The present invention provides a porous material resistant to this capillary collapse. This porosity is preferably between about 30 to 70 percent.

Improved puncture resistance can be achieved with sufficient stretching of orientation, preferably before removing the compound. The shaped material or film first is stretched biaxially (i.e., along at least two perpendicular directions). To achieve adequateorientation of the semi-crystaline thermoplastic polymer component, the film is heat treated at a temperature above the alpha transition temperature and is stretched enough to orient the mobile crystal stuctures. Alpha transition temperature is explained in Bigg, D. M., "Mechanical Property Enhancement of Semicrystalline Polymers—A Review", *Polymer Engineering and Science*, vol. 28, no. 13, July 1998, pp. 829–861. The most effective temperature range for orienting semicrystalline polymers is between the alpha crystallization temperature of the polymer and its melting point. In the presence of a compound that is miscible with a semicrystalline polymer above the melting temperature, the alpha transition temperature may reduce, allowing orientation to be carried out at a temperature below the alpha transition temperature of the pure polymer. Above the alpha transition temperature lamellar slip in crystal units, such as those contained within spherulites, occurs and extended chain crystals form. It is difficult to effectively orient polymers that do not have the alpha transition to any great extent because their crystalline regions cannot be easily rearranged into an aligned state.

Puncture resistance is a measurement of the peak load required to puncture a perimeter restrained film as in ASTM F-1306-90. The specimen clamping fixture holds the sample by compression at the annular region between two circular plates. The plates provide a 12.7-mm diameter exposed section of film. The penetration probe is a cylindrical 2-mm diameter probe having a 1-mm radius tip. The penetration probe is advanced at a rate of 2 mm/s and the maximum load before the film puncture is recorded. Values are reported in grams per unit of film thickness. The resulting puncture resistance of the biaxial stretched film described above is at least 350 g/25 $\mu$m, preferably at least 400 g/25 $\mu$m, and more preferably at least 500 g/25 $\mu$m.

Although the degree of stretch may be the same or may be different in each direction, the puncture-resistant film preferably is stretched to greater than 9 times its original area, preferably at least 15 times, and more preferably at least 25 times.

A multi-layer microporous material or film of the present invention contains the above-described microporous material as a layer with at least one additional porous layer. By way of example, the above-described porous material is preferably used in the outer two layers of a three-layer film, with a third and different porous layer therebetween.

The other layers of a two or three layer material may be prepared by melt-blending solutions such as described in U.S. Pat. No. 4,539,256, describing a melt blend solution of a compound with a crystallization phase-separated, melt-processable polymer, U.S. Pat. No. 4,867,881, describing a melt blend solution of a liquid-liquid phase-separable, melt-processable polymer and a compatible liquid, and WO 98/49225, describing a temperature sensitive microporous material.

The multi-layer film may be formed by coextrusion of the two or more polymer compositions followed by cooling to cause phase separation and then orientation of the multi-layer film to form a porous film structure as previously described. The coextrusion may employ a feedblock or a multiple manifold die. Cooling preferably comprises casting the multi-layer film onto a casting wheel. The multi-layer film may alternatively be made by laminating one or more of the layers together.

The compound used in the melt blends of the multi-layer films may also be removed by any conventional method such as washing or solvent extraction. This may be done either before or after orientation of the multi-layer film.

The microporous film can be thermally annealed after removal of the compound to improve dimensional stability. Also, after the compound has been removed, the resultant microporous material or multi-layer film may be imbibed with various fillers to provide any of a variety of specific functions, thereby providing unique articles. For example, the imbibing material or filler may be a liquid, solvent solution, solvent dispersion or solid. Such filler may be imbibed by any of a number of known methods which results in the deposition of such fillers within the porous structure of the microporous sheet. Some imbibing materials are merely physically placed within the microporous sheet. In some instances, the use of two or more reactive components as the imbibing materials permits a reaction within the microporous sheet structure. Examples of imbibing material include antistatic agents, surfactants, and solid particulate material such as activated carbon and pigments. Certain materials such as antistatic agents or surfactants, may be imbibed without removal of the compound or compatible liquid.

The microporous materials or multi-layer films of the present invention may be employed in any of a variety of situations wherein microporous structures are used, including applications desiring stability in air flow and porosity at various temperatures. The invention is particularly useful as a separator for electrochemical cells, such as lithium-ion batteries. Construction of commercially available batteries is reviewed in Johnson, B. A. and White, R. E.; "Characterization of Commercially Available Lithium-ion Batteries," *J. Power Sources*, 70(1998) 48–54. These membranes separate a lithium-intercalatable-carbon anode from the lithium-metal-oxide (e.g., $LiCoO_2$) cathode while allowing lithium transport via an imbibed lithium electrolyte within the void space of the separator. The separator must have sufficient physical strength for assembly of a battery and operation over the life span of the battery. In addition, the separators, when imbibed with an electrolyte, must have sufficiently low ionic resistance to provide practical battery operation. This often requires balancing membrane properties because physical strength is increased at lesser porosity whereas ionic resistance is minimized with greater porosity. In this regard, the microporous material of the present invention is used between each cathode and each anode in an electrochemical cell which comprises at least one cathode, at least one anode, and an electrolyte that provides a conducting path between each cathode and anode. The microporous material of the present invention enhances conduction through the separator. The inventive material layers provide strength and thermal stability to the entire construction and yet have a sufficiently low electrical resistance to enable an efficient battery function under normal operating conditions. In contrast, known materials having the requisite strength have lower air flow (higher Gurley number) and lower resistance.

The microporous material of the present invention has a Gurley number below 600 seconds per 64.5 $mm^2$, more preferably below about 500 seconds per 64.5 $mm^2$, and even more preferably below about 400 seconds per 64.5 $mm^2$. These Gurley numbers are achieved with the present invention while maintaining a porosity above 30%, more preferably above 40%.

A version marded to show changes made to the specification relative to the previous version of the specification is attached.

Objects and advantages of this invention are further illustrated by the following examples, but the particular materials and amounts thereof recited in these examples, as well as other conditions and details, should not be construed to unduly limit this invention.

Test Methods

Thickness. This value is measured in micrometers using a TMI direct contact gauge (available from Testing Machines Inc., Woburn, Mass.).

Gurley air flow. This value is a measurement of time in seconds (sec) required to pass 10 cubic centimeters (cc) of air through a material area of 64.5 square millimeters (mm$^2$) (0.1 square inches) according to ASTM D-726 Method B. These "Gurley seconds" are therefore related to flow resistance because the higher the value, the higher the flow resistance.

Ionic resistance (Ohms). The membrane sample is imbibed with a 1-M tetrabutylammonium bromide in propylene carbonate electrolyte. The membrane's major surfaces are placed between two electrodes to form an electrochemical cell. The lower electrode is a 4-cm by 4-cm stainless-steel plate; the upper electrodes is a 2-mm diameter stainless-steel electrode. The cell is designed to provide 2.21 kPa compression on the separator, and the minimum distance between the electrodes is 25 µm. The ionic resistance is measured by an AC-impedance technique. The impedance of the cell is measured using an EG&G 273A potentiostat and a Schlumberger SI 1260 frequency-response analyzer (available from Solartron, Houston, Tex.). The real and imaginary components of the impedance are measured between 25–100 kHz. These data are linearly extrapolated to determine the ionic resistance (real impedance component) at null imaginary impedance.

Porosity. Porosity is a value calculated from the measured bulk density and polymer density using the following equation:

Porosity=(1-bulk density/polymer density)×100

The bulk density is determined by dividing the weight of a 47 mm diameter sample containing eight film layers by its thickness and accounting for its area conversion factor.

EXAMPLES

Example 1

This example illustrates the effect of the concentration of amorphous glassy polymer on performance properties of a porous film.

For Sample A, a blend of 90 parts by weight of a semi-crystalline polypropylene (DS 5D45, available from Union Carbide Corp., Danbury, Conn. and 10 parts by weight of a compatible, amorphous, glassy polymer (ethylene norbornene copolymer having a Tg of 141° C. and a heat deflection temperature HDT/B at 0.45 MPa of 170° C. using the ISO 75 Part 1 and 2 method, available as Topas® 6017 from Hoechst, Summit, N.J.), were fed into a 40 mm twin-screw extruder. Mineral oil (White Mineral Oil #31, available from Amoco, Chicago, Ill.) was introduced into the extruder through an injection port to provide a melt composition of 40 wt % of the polymer blend and 60 wt % mineral oil. The polymer blend also contained 0.35 wt % of a nucleating agent (Millad™ 3905, available from Milliken Chemical Co., Spartanburg, S.C.). The overall feed rate was 18.16 kg/hr. The polymer blend was heated to 271° C. in the extruder to melt the blend and, after mixing with oil, the temperature was maintained at 188° C. during the subsequent extrusion.

An extruded film was cast to form a 0.99 mm thick film onto a casting wheel maintained at 66° C. The quench rate was increased by supplying water at ambient temperature to the air side of the cast film. The cast film was oriented 5.0 to 1 in the machine direction at 110° C. and 4.7 to 1 in the cross-web direction at 116° C., washed in dichlorotrifluoroethane, and dried to obtain a porous film.

Sample B was made in a manner similar to Sample A except the concentration of the semicrystalline polypropylene was 80 parts by weight and the compatible, amorphous, glassy polymer was 20 parts by weight.

Comparative Example 1

In this example, a film was made as in Example 1, however, no amorphous cyclic olefinic copolymer was included. The following table lists the test results for these films.

TABLE 1

Film properties with and without amorphous copolymer

| Example Film | Thickness (µm) | Gurley Number (sec) | Ionic Resistance (Ω) | Porosity (%) |
|---|---|---|---|---|
| 1A | 30 | 532 | 124 | 51 |
| 1B | 28 | 450 | 112 | 50 |
| C1 | 28 | 836 | 167 | 41 |

The film including amorphous copolymer had significantly lower air flow resistance (Gurley Number), significantly lower electrical resistance and significantly higher porosity than the comparative film without the amorphous copolymer.

The thermal properties were also compared for this example. Machine direction and cross-web direction dimensions were measured before and after the samples were subjected to 90° C. for 60 minutes. Shrinkage was reported as the percent reduction from the original dimension. An increase in air flow resistance (Gurley number) results from pore collapse in the films upon heat exposure. The percent increase in Gurley number, referred to as thermal stability, was determined by measuring the Gurley air flow of a film sample restrained in a frame both before and after heat-setting the sample for 10 minutes in an oven at 116° C. A greater percent increase in Gurley number indicates a lower thermal stability. The following table lists the test results for these films.

TABLE 2

Film thermal stability properties

| Example Film | Thermal Shrinkage (%) | | Thermal Stability (%) |
|---|---|---|---|
| | Machine Direction | Cross-web Direction | |
| 1A | 15 | 14 | 61 |
| 1B | 13 | 10 | 41 |
| C1 | 15 | 18 | 84 |

The film including amorphous copolymer had lower thermal shrinkage in both directions, and better thermal stability than the comparative film without the amorphous copolymer.

Example 2

This example illustrates the effect of amorphous glassy polymer on performance properties of a multilayer porous film.

Two melt streams were used to prepare a three-layer material. In the first melt stream, a blend of 90 parts by weight of a semi-crystalline polypropylene (DS 5D45) with a melt flow index of 0.65 g/10 min (ASTM D1238, Condition I), crystallinity of 48% and a melting point of 165° C. (both measured by Differential Scanning Calorimetry using 10° C. per minute) and 10 parts by weight of a compatible, amorphous, glassy polymer (Topas® 6017) were fed into a 40 mm twin-screw extruder. Mineral oil (White Mineral Oil #31) was introduced into the extruder through an injection port to provide a melt composition of 40 weight percent (wt %) of the polymer blend and 60 wt % mineral oil. The polymer blend also contained 0.35 wt % of a nucleating agent (Millad™ 3905). The overall feed rate was 9.08 kg/hr. The polymer blend was heated to 271° C. in the extruder to melt and, after mixing with oil, the temperature was maintained at 188° C. during the subsequent extrusion.

In the second melt stream, a blend of 30 parts by weight of the same DS 5D45 polypropylene and 70 parts by weight of an ethylene-hexene copolymer (SLP-9057, available from Exxon Chemicals, Houston, Tex.) with a melt flow index 1.2 dg/min (ASTM D1238, Condition E) and a melting point of 111° C., were fed into the hopper of a 25 mm twin-screw extruder. Mineral oil (White Mineral Oil #31) was introduced into the extruder through an injection port to provide a melt composition of 30 wt % of the polymer blend and 70 wt % mineral oil. The overall feed rate was 4.54 kg/hr. The polymer blend was heated to 271° C. to melt the blend and, after mixing with oil, the temperature was maintained at 188° C. during the extrusion. This composition provided the second melt stream in this example.

These two melt streams were combined in a triple manifold die in such a way that the first melt stream created the skin layers, where as the second melt stream created the core layer. The coextruded film was cast to form a 0.81 mm-thick film onto a casting wheel maintained at 71° C. The quench rate was increased by supplying water at ambient temperature to the air side of the cast film. The cast film was oriented 4.5 to 1 in the machine direction at 113° C. and 5.7 to 1 in the cross-web direction at 116° C., washed in dichlorotrifluoroethane, and dried to obtain a porous film. Table 3 compares the properties of this film to those of a control film made using the same process conditions but containing no amorphous glassy polymer additive.

Comparative Example 2

In this example, a three layer film was made as in Example 2, however, no amorphous, glassy polymer was included. The following table lists the test results for these three-layer films.

TABLE 3

Three-layer film properties with and without amorphous copolymer

| Example Film | Thickness (μm) | Gurley Number (sec) | Ionic Resistance (Ω) | Porosity (%) |
|---|---|---|---|---|
| 2 | 30 | 352 | 106 | 50 |
| C2 | 28 | 777 | 169 | 40 |

The film including amorphous copolymer had significantly lower air flow resistance (Gurley Number), significantly lower ionic resistance and significantly higher porosity than the comparative film without the amorphous copolymer. FIG. 1 is a field emission SEM showing the ultrafine structure of the top surface of the polypropylene film of Example 2. As this photograph shows, the ultrafine microporous structure has been preserved despite the large capillary forces acting during the drying step.

Various modifications and alterations of this invention will become apparent to those skilled in the art without departing from the scope and principles of this invention, and it should be understood that this invention is not to be unduly limited to the illustrative embodiments set forth hereinabove.

We claim:

1. A microporous material comprising
   a polypropylene polymer having at least 20 percent crystallinity; and
   a compatible, amorphous, glassy polymer,
   wherein said polymers are miscible in a compound when heated above the melting temperature of the polypropylene polymer and wherein the polymers phase separate from the compound when cooled below the crystallization temperature of the polypropylene polymer and wherein the microporous material has a microstructure comprising spherulites connected by fibrils.

2. The microporous material of claim 1 having a puncture resistance of at least 350 g/25 μm.

3. The microporous material of claim 1 in which the compatible, amorphous, glassy polymer is an ethylene norbomene copolymer having a Tg above 80° C., and it comprises greater than 0 to 30 weight percent of the microporous material.

4. A battery separator comprising the microporous material of claim 1.

5. The microporous material of claim 1 having a porosity between about 30 to 70 percent and a Gurley number below 600 seconds per 64.5 mm$^2$.

6. The microporous material of claim 1 which is a sheet material comprising two layers.

7. The microporous material of claim 6 wherein the two layers have two different compositions.

8. A three layer film wherein the outer two layers comprise the microporous material of claim 1.

9. A method of making the microporous material of claim 1, comprising:
   (a) melt blending to form a mixture comprising about 15 to 80 parts by weight of a polypropylene polymer having at least 20 percent crystallinity, greater than 0 to 30 parts by weight of a compatible, amorphous, glassy polymer, and about 20 to 85 parts by weight based on a total mixture content, of a compound, the compound being miscible with the polypropylene and glassy polymers at a temperature above the melting temperature of the polypropylene polymer;
   (b) shaping the melt blended material;
   (c) cooling the shaped material to a temperature at which phase separation occurs between the compound and the polymers through crystallization of the polypropylene polymer to form a network of polymer domains; and
   (d) creating porosity by (1) orienting said material at least in one direction to separate adjacent crystallized polymer domains from one another to provide an interconnected porous network therebetween, followed by (2) removing at least a part of the compound.

10. A method of making the microporous material of claim 1, comprising:
   (a) melt blending to form a mixture comprising about 15 to 80 parts by weight of a polypropylene polymer, greater than 0 to 30 parts by weight of a compatible, amorphous, glassy polymer, and about 20 to 85 parts by weight, based on a total mixture content, of a compound, the compound being miscible with the polypropylene and glassy polymers at a temperature above the melting temperature of the polypropylene polymer;
   (b) shaping the melt blended material;
   (c) cooling the shaped material to a temperature at which phase separation occurs between the compound and the polymers through crystallization of the polypropylene polymer to form a network of polymer domains;

(d) stretching the shaped material in at least one direction to provide a network of interconnected regions comprising the compound, and then (e) removing the compound to provide a microporous material.

11. The method of claim 10 wherein the stretching step provides an area expansion ratio of greater than nine.

12. A microporous material comprising a polypropylene polymer having at least 20 percent crystallinity; and a compatible, amnorphous, glassy ethylene norbornene copolymer, wherein said polymers are miscible in a compound when heated above the melting temperature of the polypropylene polymer and wherein the polymers phase separate from the compound when cooled below the crystallization temperature of the polypropylene polymer and wherein the microporous material has a microstructure comprising an interconnected porous network of crystallized polymer spherulites connected by amorphous polymer fibrils.

13. A The microporous material of claim 12 having a puncture resistance of at least 350 g/25 $\mu$m.

14. The microporous material of claim 12 in which the ethylene norbornene copolymer has a Tg above 80° C., and comprises greater than 0 to 30 weight percent of the microporous material.

15. A battery separator comprising the microporous material of claim 14.

16. The microporous material of claim 14 having a porosity between about 30 to 70 percent and a Gurley number below 600 seconds per 64.5 $mm^2$.

17. The microporous material of claim 12 which is a sheet material comprising two layers.

18. The microporous material of claim 17 wherein the two layers have two different compositions.

19. A three layer film wherein the outer two layers comprise the microporous material of claim 12.

* * * * *